Dec. 2, 1969     S. S. WEST ET AL     3,481,671
APPARATUS AND METHOD FOR OBTAINING OPTICAL ROTATORY
DISPERSION MEASUREMENTS
Filed July 27, 1966

INVENTOR
SEYMOUR S. WEST &
JOHN W. LISKOWITZ

BY *Hurwitz & Rose*

ATTORNEYS

United States Patent Office 3,481,671
Patented Dec. 2, 1969

3,481,671
APPARATUS AND METHOD FOR OBTAINING OPTICAL ROTATORY DISPERSION MEASUREMENTS
Seymour S. West, Birmingham, Ala., and John W. Liskowitz, Belle Meade, N.J., assignors to Melpar, Inc., Falls Church, Va., a corporation of Delaware
Filed July 27, 1966, Ser. No. 568,286
Int. Cl. G01j *3/42;* G01n *21/40*
U.S. Cl. 356—96
9 Claims

ABSTRACT OF THE DISCLOSURE

Apparatus for determining the optical activity of a substance includes a source of a beam of parallel rays of light covering a wide spectral band. A polarizer is positioned in the path of the light beam to plane-polarize the beam, and the substance under investigation is supported to permit passage of the plane-polarized beam therethrough. An analyzer is positioned relative to the supported substance to pass the wideband plane-polarized light beam emanating from the substance according to the relative orientation of the plane of polarization of the analyzer and the plane of polarization of the beam. Depending upon the optical activity of the substance the plane of polarization of each spectral component of the light in the beam undergoes rotation, upon passage through the substance, through an angle that is a function of the respective wavelength of the component. In addition, either the polarizer or the analyzer is rotated at a constant angular frequency to produce pulsations of the light intensity of the beam emerging from the analyzer, at a frequency related to the angular frequency of rotation. The beam is then separated into a plurality of distinct beams of its spectral components of predetermined wavelengths, and these beams simultaneously analyzed to detect the relative phase angles between them as a concurrent measure of the optical rotatory dispersion characteristics of the substance.

---

Figure 1:
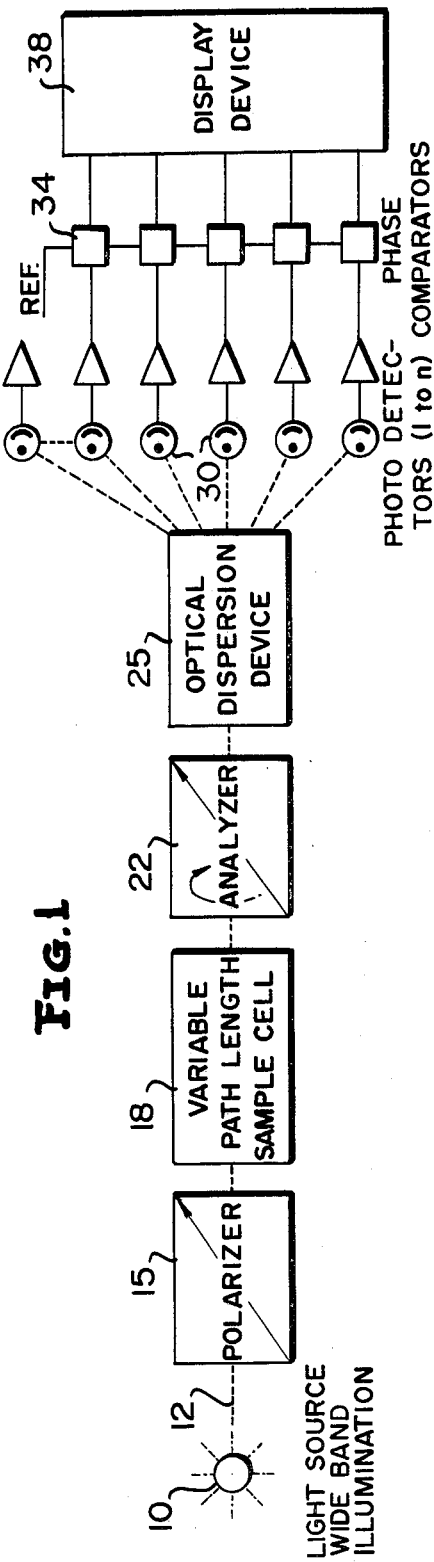

The present invention relates generally to improved apparatus and methods for obtaining optical rotatory dispersion measurements, and more particularly to single beam instruments utilizing the principle of phase detection to obtain optical rotatory dispersion measurements in highly absorbing and scattering media.

In the prior art, instruments used for obtaining optical rotation and rotatory dispersion measurements on optically active substances by phase detection principles have been of the double beam type. A typical example of the known devices in this field is disclosed in U.S. Patent 2,731,875, issued Jan. 24, 1956, to J. H. Gould. In the Gould apparatus, light deriving from a monochromatic source is collimated to form a beam of parallel rays, and the beam directed through an optical path along which it is plane polarized by a fixed polarizer. The plane polarized beam is subsequently split by an appropriate prism in the optical path, and the two beams thus formed are directed through separate rotating analyzers to impinge upon respective photodetectors. With an optically active medium or sample placed ahead of the rotating analyzer in the path of one of the two beams, the maximum intensity of light incident on the detector in that path varies relative to the maximum intensity of light as detected in the reference (no sample) channel; that is, the two beams of light pulsate in intensity and the pulsations are displaced in phase relative to one another. Hence, the outputs of the respective photodetectors differ in phase and this phase difference provides a measure of optical rotation produced by the sample. Measurements obtained using such instruments can be accurate; provided, however, that the instrument is carefully calibrated, and this often requires that corresponding components in the two channels be identically matched to prevent measurement error that might otherwise be caused by initial differences and subsequent variations in the instrumentation.

In another known type of double-beam phase-detecting instrument, exemplified by that disclosed in U.S. Patent 2,861,493, issued Nov. 25, 1958, to Landegren, measurements of concentration and optical rotatory power of an optically active substance are obtained essentially by reversing the roles of the polarizer and analyzer from those found in the first-mentioned type. That is, the polarizer is rotated to rotate the plane of polarization of the light beam passed therethrough, while the analyzers are fixed. The relative phase displacement between the detected light intensity pulsations in the sample and reference channels then provides the desired measurements. The latter type of double beam instrument is, of course, subject to the same disadvantages as are present in the previously discussed type of double beam instrument.

Moreover, all known double beam polarimetric instruments utilizing phase detection to provide optical rotatory dispersion measurements are inadequate for the purpose of obtaining practically instantaneous dispersion curves because they require that measurements be performed separately at each designated wavelength. Consequently, the time required for each optical rotation measurement precludes measurements involving substances having short life times. A further difficulty is manifest in any attempt to apply the methods employed in double beam instruments to single path optical systems such as microscopes.

Accordingly, it is a primary object of the present invention to overcome one or more of the above-mentioned disadvantages of prior art double beam polarimeters.

It is a more specific object of the present invention to provide a single-beam phase-detecting polarimetric instrument by which to obtain optical rotatory dispersion measurements.

Another object of the invention is to provide methods and apparatus for obtaining optical rotatory dispersion measurements at several wavelengths on a substantially instantaneous basis.

A further object of the invention is to provide single beam polarimetric phase detecting instruments which may be used in conjunction with single path optical systems such as microscopes.

Still another object of the present invention is to provide single beam polarimetry apparatus for obtaining optical rotatory dispersion curves on optically active specimens, wherein the specimens may be examined either in vivo or in vitro.

Briefly, the above and other objects of the present invention are provided, in one embodiment, by the utilization of a single beam of light obtained from a source of broad spectral band illumination, the beam being directed along an optical path including a fixed polarizer, variable path length sample chamber, rotating analyzer, and optical dispersion device, disposed in the specified order (although the polarizer may be rotating and the analyzer fixed, if desired). As the beam of light travels along the optical path containing these components its plane of polarization is rotated through a specific angle, the magnitude and sign of the angle being governed by a number of factors, including the type of sample or specimen under observation, the optical path length through the sample, and the wavelength of the light in the beam. It will be noted, then, that if the light beam is broad band while other factors controlling angle of rotation are held constant during any given measurements, the angle through which the plane of polarization of each wavelength of the light beam rotates may be detected to provide the desired instantaneous dispersion curves.

In other words, the rotation of the plane of polarization of the light beam as it passes through the sample will differ for each wavelength of light in the beam, while the constant rotation of one of the polarizing elements (either polarizer or analyzer) will result in the emergence of a beam of light of pulsating intensity from the second of the two polarizing elements to be traversed by the beam. Hence, although the light intensity pulsations will have the same frequency, related to the angular frequency of rotation of the rotating polarizing element, for all wavelengths of light in the beam, the relative phases of the pulsation frequency will differ for each wavelength. The optical dispersion device located behind the analyzer functions to disperse the different wavelengths of light in different directions, i.e. a plurality of beams of light, each of a distinct wavelength and each traveling along a different path, will emerge from the dispersion device. By proper placement of photosensitive detector, such as conventional photocells, to intercept light of selected wavelengths, electrical signals may be obtained which have a frequency proportional to the variation in intensity (i.e., the pulsations) of the light beam incident on each cell. Again, each signal has the same frequency, but differs in phase, relative to each of the other signals. Substantially instantaneous dispersion curves are obtained for the sample under observation by applying the output signal of each photocell to a different one of parallel signal channels. Each signal channel contains a phase comparator, responsive to a reference signal of the same frequency as the cell output signal and to the latter, so that each comparator is associated with a specific wavelength of light and functions to produce an output signal or reading indicative of the difference in phase between the received signal and the reference signal. These differences are a measurement of optical rotation at specific wavelengths of light for the specimen under observation and may be recorded simultaneously on any suitable conventional display device.

It will be noted that several advantages obtain from the method of measurement employed in the embodiment briefly described above, by which the aforementioned objects and still further objects of the invention are achieved. For examle, measurements may be made using a source of broad spectral band illumination; only one beam of light is required, making instruments according to the invention readily operable with single optical path systems, such as microscopes, which are difficult to duplicate; dispersion or selection apparatus is located behind the analyzer component in the optical path, permitting substantially instantaneous measurements to be performed, extremely valuable in those situations where substances having short life times are under observation; only one photodetector and associated circuit apparatus is required for each wavelength of light under observation by virtue of single beam operation throughout.

In accordance with another embodiment of the invention, sequential rather than parallel operation of the photodetection apparatus may be utilized where the time required to obtain each dispersion measurement or curve is not critical, e.g., where the life time of the optically active substance is not unduly short. In this embodiment, the measurements of optical rotation are performed by selectively and sequentially switching the output signals of the several photodetectors to a single measuring channel containing an amplifier and phase meter. Again, the phase meter or comparator provides a measure of the difference in phase between each of the sequentially applied signals, derived from pulsations of different wavelengths of light, and the reference signal, from which sequential dispersion curves may be obtained.

Figure 2:
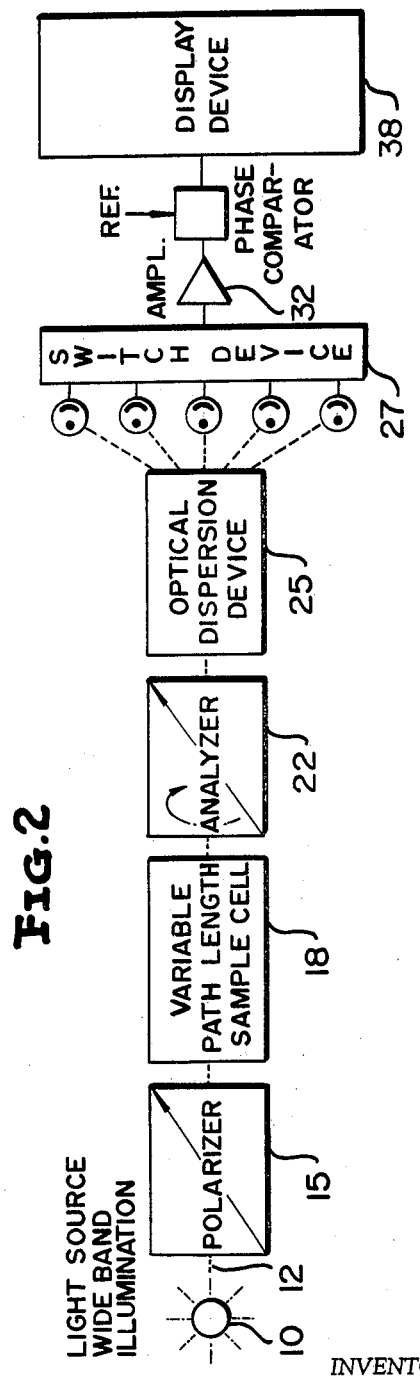

The above and still further objects, features and attendant advantages of the present invention will become apparent from a consideration of the following detailed description of specific embodiments thereof, especially when taken in conjunction with the accompanying drawings, in which:

FIGURE 1 is a schematic diagram of one embodiment of the invention, wherein simultaneous dispersion measurements are obtained; and FIGURE 2 is a schematic diagram of another embodiment of the invention, wherein sequential measurements are obtained.

Referring now to FIGURE 1, an embodiment of the present invention suitable for obtaining simultaneous optical rotary dispersion measurements for an optically active substance, includes a light source 10 which is capable of providing broad spectral band illumination. A suitable source of light, for example, is a xenon lamp. A parallel beam of light from the source 10, obtained in any conventional manner, as by using any of a number of well known lenses (not shown) particularly adapted for such purpose, is projected along a path 12, hereinafter referred to as "the optical path." Such a light beam will, of course, contain wavelengths of light over the broad spectral band produced by source 10, as contracted with the single wavelength or, more precisely, the extremely narrow range of wavelengths provided by a monochromatic source.

Disposed along and interposed in the optical path 12 are a polarizer 15, which may be rotating or fixed and which functions to confine the vibrations of the field vector of the light passing therethrough to a single plane, also rotating or fixed in accordance with the motion, or lack of motion, of polarizer 15; a variable path length sample cell or chamber 18, containing the optically active substance to be analyzed; an analyzer 22 which is simply another polarizer and which is rotating or fixed depending respectively upon whether polarizer 15 is fixed or rotating; and an optical dispersion device 25, which functions to disperse the broad spectral band light beam incident thereon by passing light of different wavelengths in different directions.

Polarizer 15 and analyzer 22 may, for example, each constitute a Nicol prism or a polarizing film ("Polaroid"), one rotating and one fixed as previously stated. Rotation of the polarizer (or analyzer) may be accomplished in any conventional manner.

Variable path length sample chamber 18 is simply a container of variable thickness, or is operable to place more or less of the optically active substance contained therein in the light path 12. In this respect, it may be stated that chamber 18 merely permits undisturbed passage of the light beam through the substance under observation and is operative in a conventional manner to selectively vary the length of the light path encountered through the substance to be analyzed. Since, as previously noted, the length of the light path through the optically active substance is one factor which determines the angle through which the plane of polarization of the light beam rotates, it will be apparent that for purposes of the present invention this factor is maintained constant during any given measurement.

As is well known, an optically active substance is one which has the property of rotating the plane of polarization of plane-polarized light passing therethrough, and since different optically active substances have different rotatory power, the angle through which the plane of polarization rotates will depend upon the particular substance under observation. Moreover, the angle of rotation may be in either direction, i.e., positive or negative relative to a reference direction, also depending upon the substance being examined. In addition, the sample may be in a liquid or a solid state, and such characteristics as concentration of the substance in solution, optical rotation, rotatory dispersion, and so forth, may be determined either by way of direct reading, using known scale factor or calibration techniques, or calculation, from a measurement or measurements of optical rotatory power of the substance. Throughout this specification, the optically active substance under observation is variously referred to as "substance," "sample" or "specimen."

Another property of optically active substances is that plane-polarized light passing therethrough undergoes optical rotation through an angle which varies according to the wavelength of the light. As previously noted, and as will be more fully discussed presently, this particular property is exploited to greatest advantage by apparatus according to the present invention.

Optical dispersion device 25 may, for example, be either a refraction prism or diffraction grating, both types of dispersion devices being well known in the art and readily available. Since such devices are operative to disperse broad band light by separating it into components according to wavelength and sending these different components of the original light beam in different, determinable directions, photosensitive devices 30 may be placed in such manner with respect to the location of the dispersion device that a separate beam component; i.e., light of a different wavelength, will be incident on each photosensing element. The photosensors 30 may, for example, be conventional photo-electric transducers; that is, devices which produce output signals whose frequencies are proportional to variations in intensity of light incident on the transducers.

In the embodiment shown in FIGURE 1, the photosensitive devices are schematically designated as conventional photocells. The output terminals of each photocell are connected to a separate signal translation channel, each of which may contain a conventional signal amplifier 32 and a phase comparator 34. A reference signal, which may be simply an amplified output signal of one of the photocells 30 associated with a specific known wavelength of light, is applied to one input of each comparator 34, while the amplified signal carried by the associated channel is applied as the other input. The output signals deriving from the phase comparators are therefore proportional to and indicative of the phase of each respective channel input signal relative to the reference frequency, and may be applied to a suitable display device 38 for viewing or recording in the form of rotatory dispersion curves at the several wavelengths. Hence, the phase comparators provide a measure of the optical rotatory power of the optically active substance under observation for each of several preselected wavelengths of light.

In operation, the broad band light beam emanating from source 10 (and associated lenses) encounters fixed polarizer 15, so that a plane polarized light beam emerges from the polarizer. As the polarized beam passes through a specified length of the optically active sample supported by chamber 18, the plane of polarization of the beam undergoes rotation through a different angle for each wavelength of light in the beam. Subsequently, the beam passes through analyzer 22, rotated at a constant angular frequency and thus causing the emergent light beam to pulsate in intensity at a frequency related to that angular frequency of rotation. As the pulsating beam passes through optical dispersion device 25 a plurality of beams are created; each of different wavelength, pulsating at the same frequency, but displaced in phase relative to one another, and traveling in different directions. Light beams of preselected wavelengths are incident on separate ones of the plurality of photocells 30 located in the selected beam paths, thereby producing output signals of identical frequency and different phase in each of the respective signal translation channels. The separate signals may be amplified prior to phase comparison with the signal of reference frequency, as previously discussed, whereby to provide the desired measurements of optical rotation.

In the embodiment of FIGURE 2 sequential measurements are obtained by use of apparatus similar to that shown in FIGURE 1, except that the output signals deriving from photocells 30 are selectively and sequentially applied to a single signal translation channel, containing amplifier and phase comparator as before. To this end, a separate switch may be connected to the output terminals of each photocell and to the single output channel, each switch normally biased to an open position. The switches may then be manually closed in selected sequential order, as desired, or may be automatically closed in sequence under the control of a conventional timed commutator, for example, so that each photocell output signal is separately applied to the phase comparator or phase meter for an interval of time sufficient to permit the desired measurement.

While we have disclosed two specific embodiments of our invention, it will be apparent that various changes and modifications in the details of construction and operation specifically illustrated and described may be resorted to without departing from the spirit and scope of the invention.

We claim:

1. The combination comprising means for producing a beam of parallel rays of broad spectral band light; first and second light polarizing means arranged in spaced relationship in the path of said broadband beam; means for supporting an optically active substance in the broadbeam path between said first and second polarizing means; means for rotating one of said first and second polarizing means relative to the other at a predetermined angular frequency whereby the broadband beam emerging from said second polarizing means pulsates in light intensity at a frequency related to said angular frequency of rotation; and means responsive to said broadband pulsating beam for separation thereof into a plurality of spectral components of different preselected wavelengths of light in the pulsating beam, and means for detecting the phase of the pulsation frequency of each preselected wavelength relative to the phase of a reference frequency of the same frequency value.

2. The combination according to claim 1 wherein said separation means includes means for separating said preselected wavelengths of light into individual beams, each of different wavelength and each traveling along a distinct and differet path.

3. The combination comprising means for producing a beam of parallel rays of broad spectral band light; first and second light polarizing means arranged in spaced relationship in the path of said beam; means for supporting an optically active substance in the beam path between said first and second polarizing means; means for relatively rotating one of said first and second polarizing means with respect to the other at a predetermined relative angular frequency whereby the broadband beam emerging from said second polarizing means pulsates in light intensity at a frequency related to said angular frequency of rotation; and means for simultaneously analyzing distinct and different preselected wavelengths of light in the pulsating beam, including means for simultaneously detecting the respective phase displacements of the pulsation frequency of each of said preselected wavelengths of light relative to a reference phase of the same frequency value.

4. The combination according to claim 1 wherein said separation means includes means for selectively and sequentially detecting the phase relationship between the pulsation frequency of each of said preselected wavelengths of light and said reference frequency.

5. The combination according to claim 3 wherein said means for simultaneously detecting relative phase displacements comprises a plurality of photo-electric transducers, each arranged so that light of different preselected wavelength in said beam is incident thereon and each constructed to produce an output signal having a frequency which varies in accordance with variations of intensity of light incident thereon; and a plurality of phase-sensitive means, each responsive to the output signal of a different one of said photoelectric transducers and to a signal of said reference frequency, for indicating the difference in phase between the respective transducer output signal and said reference frequency signal, to provide a substantially instantaneous measure of the optical rotatory power of said substance for light of each of the wavelengths under observation.

6. The combination comprising means for producing a beam of parallel rays of broad spectral band light; first and second light polarizing means arranged in spaced relationship in the path of said beam; means for supporting an optically active substance in the beam path between said first and second polarizing means; means for rotating one of said first and second polarizing means with respect to the other at a predetermined angular frequency whereby the broadband beam emerging from said second polarizing means pulsates in light intensity at a frequency related to said angular frequency of rotation; and means for analyzing different preselected wavelengths of light in the pulsating beam to detect the phase of the pulsation frequency of each preselected wavelength relative to a reference phase of the same frequency value, including means for selectively and sequentially detecting the phase relationship between the pulsation frequency of each of said preselected wavelengths of light and said reference frequency; said means for selectively and sequentially detecting phase relationship comprising a plurality of photo-electric transducers, each arranged so that light of different preselected wavelength in said beam is incident thereon and each constructed to produce an output signal having a frequency which varies in accordance with variations in intensity of light incident thereon; phase sensitive means responsive to a pair of input signals of like frequency for indicating the difference in phase therebetween; means for applying a signal of said reference frequency as one of said pair of input signals to said phase sensitive means; and switching means for selectively applying the output signals of said photo-electric transducers to said phase sensitive means in a predetermined sequence as the other of said pair of input signals.

7. Apparatus for measuring the optical activity of a substance, comprising
   a source of a beam of parallel rays of light covering a wide spectral band,
   means positioned in the path of said beam of light for plane-polarizing the beam of light,
   means supporting said substance for passage of the wideband plane-polarized light beam therethrough to produce rotation of the plane of polarization of each spectral component of the light beam as a function of the wavelength of the respective component,
   means positioned relative to the supported substance for analyzing the polarization of the wideband plane-polarized light beam emanating from the substance, one of said polarizing means and said analyzing means being rotatable at a substantially constant angular frequency during passage of the light beam along said path to produce pulsations of the light intensity of said beam at a frequency related to the angular frequency of rotation, upon passage through said analyzing means,
   means positioned to receive the pulsating light beam emerging from said analyzing means for separating said light beam into a plurality of its spectral components of distinct and different predetermined wavelengths, and
   a plurality of means responsive to respective ones of the separate spectral components for simultaneous detection of the relative phase angles therebetween at said pulsation frequency, as a measure of the rotatory dispersion characteristics of said substance at a plurality of wavelengths corresponding to the predetermined wavelengths of the separate spectral components to which said detection means are responsive.

8. The apparatus of claim 7, wherein said separating means comprises optical dispersion means for dividing said light beam into a plurality of beams of respective ones of said separated spectral components; and wherein said detection means includes a plurality of photoelectric devices positioned to intercept respective ones of said spectral component beams to generate electrical signal as a function of the frequency and phase angle of the pulsations of intensity of the respective spectral component beam incident thereon, and a plurality of phase comparison means responsive to respective ones of the electrical signals generated by said photoelectric devices and to a reference signal having a frequency equal to said pulsation frequency and a fixed reference phase for simultaneously determining the respective phase angles of said generated signals relative to said reference signal.

9. The apparatus of claim 7 wherein said supporting means comprises a cell transparent to said wideband beam of light and having a variable path length for varying the length of said substance through which said wideband beam travels.

References Cited

UNITED STATES PATENTS

| 2,731,875 | 1/1956 | Gould. |
| 2,861,493 | 11/1958 | Landegren. |
| 2,877,683 | 3/1959 | Fischer. |
| 2,928,310 | 3/1960 | Christie. |
| 3,080,788 | 3/1963 | Saunderson. |
| 3,155,762 | 11/1964 | Gillham et al. |
| 3,164,662 | 1/1965 | Grosjean et al. |

OTHER REFERENCES

Gillham, King, "New Design of Spectropolarimeter," January 1961, Journal of Scientific Instruments, vol. 38, pp. 21–25.

JEWELL H. PEDERSEN, Primary Examiner

T. MAJOR, Assistant Examiner

U.S. Cl. X.R.

356—116